United States Patent
Oya

(10) Patent No.: US 12,423,785 B2
(45) Date of Patent: Sep. 23, 2025

(54) IMAGE PROCESSING APPARATUS, IMAGE PROCESSING METHOD, IMAGE PICKUP APPARATUS, ON-BOARD SYSTEM, AND MOVABLE APPARATUS

(71) Applicant: CANON KABUSHIKI KAISHA, Tokyo (JP)

(72) Inventor: Tsuyoshi Oya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 305 days.

(21) Appl. No.: 18/230,781

(22) Filed: Aug. 7, 2023

(65) Prior Publication Data
US 2024/0087100 A1  Mar. 14, 2024

(30) Foreign Application Priority Data
Sep. 12, 2022  (JP) .................... 2022-144761

(51) Int. Cl.
 G06T 5/80 (2024.01)
 B60Q 9/00 (2006.01)
 B60T 7/12 (2006.01)
 G06V 10/70 (2022.01)
 G06V 20/58 (2022.01)

(52) U.S. Cl.
 CPC ............ *G06T 5/80* (2024.01); *B60Q 9/008* (2013.01); *B60T 7/12* (2013.01); *G06V 10/70* (2022.01); *G06V 20/58* (2022.01); *B60T 2210/32* (2013.01); *G06T 2207/20081* (2013.01); *G06T 2207/30261* (2013.01)

(58) Field of Classification Search
 CPC ....... B60Q 9/008; B60T 2210/32; B60T 7/12; G06T 2207/20081; G06T 2207/30261; G06T 5/80; G06V 10/70; G06V 20/58
 See application file for complete search history.

(56) References Cited

U.S. PATENT DOCUMENTS

2014/0160169 A1*  6/2014  Ishii ................ H04N 9/3185
                                                    345/672
2020/0236277 A1*  7/2020  Odamaki ............... G06T 3/14

FOREIGN PATENT DOCUMENTS

JP   5739722 B2   6/2015
JP   6820489 B2   1/2021

OTHER PUBLICATIONS

Fan et al, Wide-angle Image Rectification: A Survey), arXiv, 2021 (Year: 2021).*

(Continued)

*Primary Examiner* — Ruiping Li
(74) *Attorney, Agent, or Firm* — Carter, DeLuca & Farrell LLP

(57) ABSTRACT

An image processing apparatus includes a memory storing instructions, and a processor configured to execute the instructions to generate, using a first image obtained by imaging a three-dimensional space including an object through an optical system of a first projection method, a second image obtained by a second projection method different from the first projection method, and perform object detection using the second image. A distortion ratio on the second image satisfies a predetermined condition.

12 Claims, 5 Drawing Sheets

(56) References Cited

OTHER PUBLICATIONS

Jiang et al, "Distortion correction for a wide-angle lens base on real-time digital image processing", Opt. Eng., 2003 (Year: 2003).*
Zhao et al, "Revisiting Radial Distortion Rectification in Polar-Coordinates: A New and Efficient Learning Perspective", IEEE, 2022 (Year: 2022).*

* cited by examiner

IMAGE PROCESSING APPARATUS, IMAGE PROCESSING METHOD, IMAGE PICKUP APPARATUS, ON-BOARD SYSTEM, AND MOVABLE APPARATUS

BACKGROUND

Technical Field

One of the aspects of the embodiments relates to an image processing technology for detecting an object.

Description of Related Art

Object detection using machine learning is demanded to be applied not only to a planar image with little distortion obtained by imaging through a lens with a general angle of view, but also to a wide-field image such as a fisheye image with large distortion obtained by a wide-angle lens such as a fisheye lens. However, in a case where an object detection method for a planar image is applied to a wide-field image as it is, the detection accuracy for an object in the wide-field image deteriorates. Even if a wide-field image is converted into a planar image while its wide field is maintained and the object detection method for a planar image is applied to the post-conversion planar image, the object detection accuracy deteriorates because a peripheral area in the post-conversion planar image is significantly expanded.

Japanese Patent No. 6820489 discloses a method of dividing a fisheye image into a plurality of image areas in a distortion direction and performing object detection in each image area. This method enables object detection without converting a fisheye image into a plane image. Japanese Patent No. 5739722 improves object detection accuracy by dividing a fisheye image in a circumferential direction, converting it into rectangular plane images, and applying an object detection method for a plane image to the post-conversion plane images.

The method disclosed in Japanese Patent No. 6820489 requires additional calculations such as rotating the image and performing object detection for each rotation, in order to detect an object that is located at the boundary between divided areas in a fisheye image. The method disclosed in Japanese Patent No. 5739722 cannot detect an object across a plurality of divided areas in a fisheye image.

SUMMARY

An image processing apparatus according to one aspect of the embodiment includes a memory storing instructions, and a processor configured to execute the instructions to generate, using a first image obtained by imaging a three-dimensional space including an object through an optical system of a first projection method, a second image obtained by a second projection method different from the first projection method, and perform object detection using the second image. Where an elevation angle is defined in an angle direction orthogonal to a polar angle direction in an azimuth of an object point within the three-dimensional space expressed by a polar coordinate system with a pole that is set to an optical axis of the optical system, a first ratio is defined as a ratio of a change rate of an image length relative to a polar angle on the first image relative to the object point to a change rate of an image length relative to the elevation angle on the first image relative to the object point, and a second ratio is defined as a ratio of a change rate of an image length relative to the polar angle on the second image relative to the object point to a change rate of an image length relative to the elevation angle on the second image relative to the object point, the second ratio is closer to 1 than the first ratio at a polar angle of 45° or more and the second ratio is 0.9 or higher and 1.1 or lower. An image processing method corresponding to the above image processing apparatus also constitutes another aspect of the embodiment. An image pickup apparatus including the above image processing apparatus also constitutes another aspect of the embodiment. An on-board system and a movable apparatus each including the above image pickup apparatus also constitute another aspect of the embodiment.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

A description will now be given of a projection method and a projection function according to a first embodiment. Distortion in an object image is the main cause of deterioration in object detection accuracy in a wide-field image such as a fisheye image obtained by imaging through a wide-angle lens such as a fisheye lens. Distortion means that a distance on an image relative to a viewing angle of the object is not equal in an angle of view direction.

Figure 1:
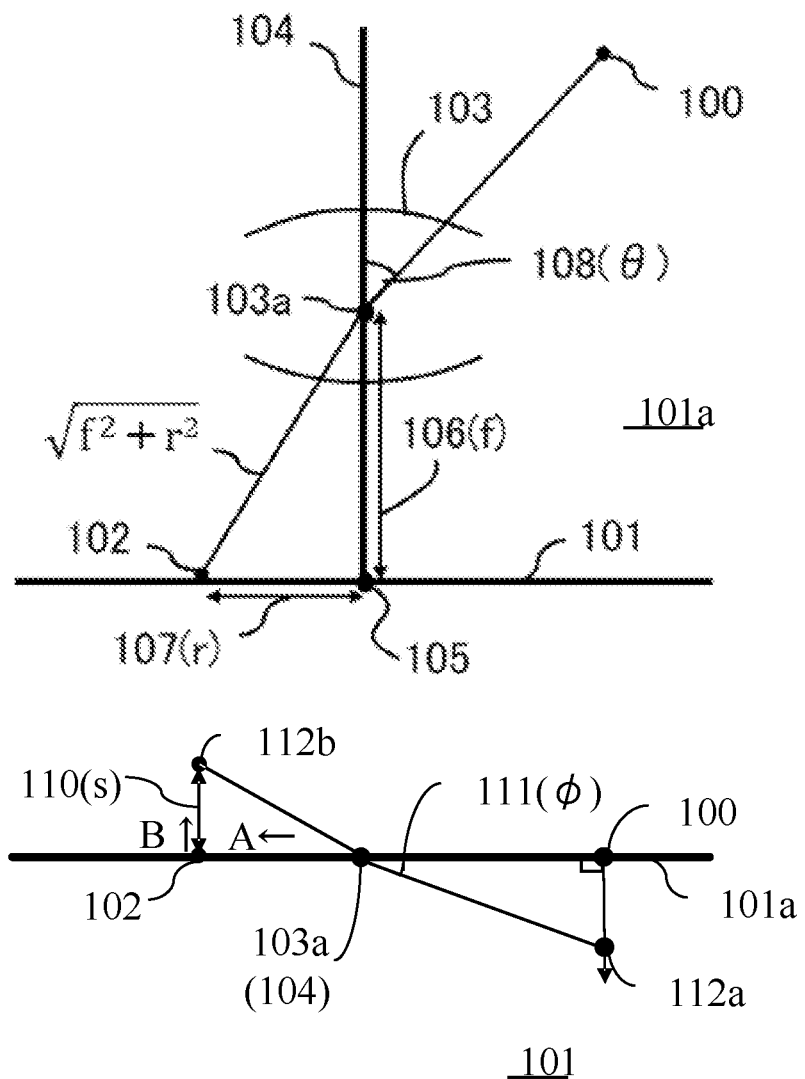
FIG. 1 is a schematic diagram for explaining a projection method according to a first embodiment.

FIG. 1 is a schematic diagram illustrating projection in imaging a three-dimensional space represented by a polar coordinate system through an optical system 103 as a fisheye lens. A figure at the upper part illustrates a relationship between an object point 100 and an object plane 101a passing through an optical axis 104. A figure at the lower part illustrates a relationship viewed from the image plane 101.

In imaging, light from the object point 100 in the three-dimensional space is projected onto an image point 102 on the image plane 101 through an optical system 103. The optical axis 104 is a straight line passing through an optical center 103a of the optical system 103 and orthogonal to the image plane 101, and an image origin 105 is set as an intersection of the optical axis 104 and the image plane 101 (that is, the image center on the optical axis). A distance between the optical center 103a and the image origin 105 is a focal length 106 of the optical system 103, and a distance between the image origin 105 and the image point 102 is an image distance radius 107.

An elevation angle 111 at the object point 100 is an angle formed by the object point 100 and a point 112a located on a straight line orthogonal to the object plane 101a from the object point 100 where the optical center 103a is set as the origin. A vertical image distance 110 is defined as a distance from the image point 102 on the image plane 101 to a point 112b located on a straight line orthogonal to the object plane 101a. In the following description, a direction in which a polar angle 108 increases and decreases will be called a polar angle direction, a direction in which an azimuth angle increases and decreases will be called an azimuth angle direction, and a direction in which the elevation angle 111 increases and decreases will be called an elevation angle direction.

The direction from the optical center 103a of the optical system 103 to the object point 100 can be expressed by the polar angle 108, which is an angle relative to the optical axis 104, and the azimuth angle, which is a rotation angle about the optical axis 104. The position of the image point 102 can be expressed by the image distance radius 107 from the image origin 105 and the azimuth angle. The projection function indicates a relationship between the polar angle 108 and the image distance radius 107 at this time.

Where θ is the polar angle 108, r is the image distance radius 107, and f is the focal length 106 of the optical system 103, the object point 100 and the image point 102 are located on the same line passing through the optical center 103a in a case where r/f=tan(θ) is satisfied, and this is commonly called perspective projection.

Four representative projection methods (first projection method) for fisheye lenses include stereographic projection r/f=2 tan(θ/2), equidistant projection r/f=θ, equisolid angle projection r/f=2 sin(θ/2), and orthogonal projection r/f=2 sin(θ/2).

A description will now be given of a distance per viewing angle in a polar angle direction A and an elevation angle direction B on the image plane 101. Here, a distance (image length) per viewing angle on the image plane 101 will be called a unit image distance. Where θ is the polar angle 108, r is the image distance radius 107, s is the vertical image distance 110, and φ is an elevation angle 111, a unit image distance in the polar angle direction A on the image plane 101 becomes dr/dθ, and a unit image distance in the elevation angle direction B on the image plane 101 becomes ds/dφ. dr/dθ and ds/dφ respectively correspond to a change rate (increase rate) of the unit image distance of the polar angle and the elevation angle relative to the object point.

Since the distance from the optical center 103a to the image point 102 illustrated in FIG. 1 is √(f2+r2), the following relationship is established:

$$s=\sqrt{(f^2+r^2)}\tan(\varphi)$$

Differentiating this equation will give the following equation:

$$ds/d\varphi=\sqrt{(f^2+r^2)}/\cos 2(\varphi)$$

A solution where φ=0 is obtained as follows:

$$ds/d\varphi=\sqrt{(f^2+r^2)}$$

The inventor found that in a case where a ratio of these unit image distances dr/dθ and ds/dφ is not constant, the object on the image plane expands, contracts, and distorts, which is a factor in lowering the object detection accuracy. A distortion ratio D representing this distortion can be calculated by the following equation:

$$D = \frac{dr/d\theta}{ds/d\varphi} = \frac{1}{\sqrt{f^2+r^2}}\frac{dr}{d\theta} \quad (1)$$

Assuming that the distortion ratio D is constant, r/f=sinh(Dθ) can be obtained from the solution of equation (1). sinh is a bipolar function and represents a hyperbolic sine. r/f=sinh(θ) is obtained with D=1.0. The distortion ratio D is constant means that D is 0.9 or higher and 1.1 or lower, and the projection method represented by the projection function r/f=sinh(Dθ) at this time will be called equi-distortion projection (second projection method).

Figure 2:
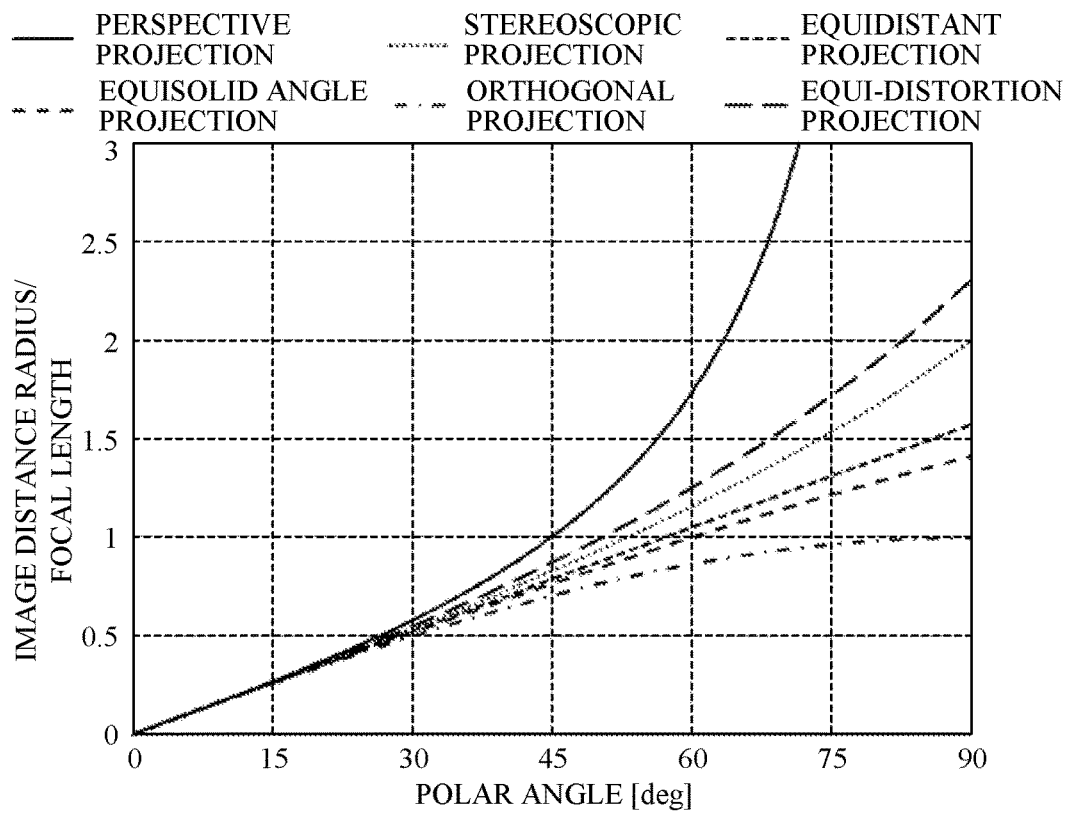
FIG. 2 illustrates the characteristic for each projection method according to the first embodiment.

FIG. 2 illustrates a characteristic (projection function) of each projection method described above. In FIG. 2, a horizontal axis represents a polar angle, and a vertical axis represents an image distance radius normalized by the focal length. Where the polar angle is small such as 30° or lower, the image distance radius of any one of the projection functions is directly proportional to the polar angle and has substantially the same image distance radius. More specifically, in perspective projection, the image distance radius sharply increases at a polar angle exceeding 45° and becomes infinite as the polar angle approaches 90°. In equidistant projection, the image distance radius is directly proportional to the polar angle even if the polar angle exceeds 30°. In orthographic projection, the image distance radius approaches the focal length in a case where the polar angle exceeds 60°.

Figure 3:
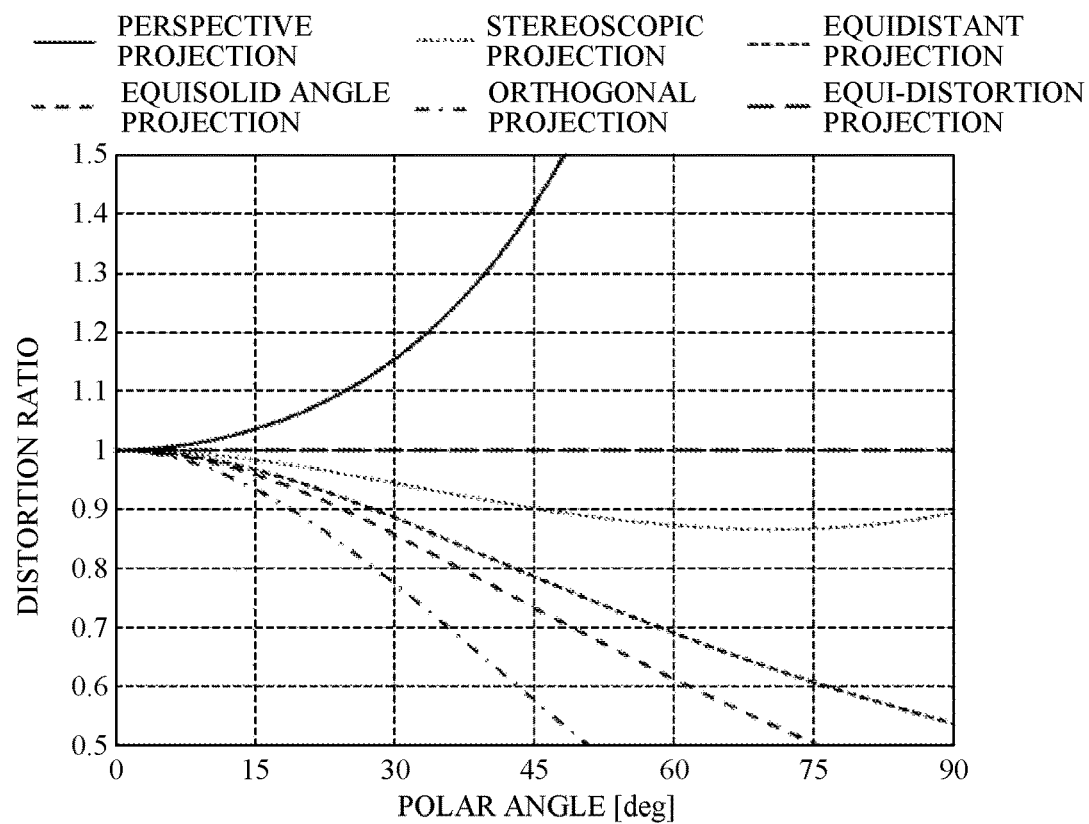
FIG. 3 illustrates a distortion ratio for each projection method according to the first embodiment.

FIG. 3 illustrates an example of the distortion ratio D for each projection method. In FIG. 3, a horizontal axis represents a polar angle, and a vertical axis represents a distortion ratio D expressed by equation (1). As the polar angle increases, the distortion ratio (first ratio) D becomes greater than 1 for perspective projection, for example, and the distortion ratios (first ratio) D for stereoscopic projection, equidistant projection, equisolid angle projection, and orthographic projection become lower than 1. Relative to these well-known projection methods, the distortion ratio (second ratio) D is constant at 1.0 (0.9≤D≤1.1) regardless of the polar angle in equi-distortion projection.

Figure 4A:
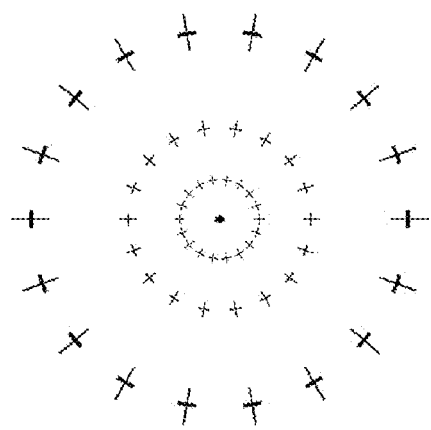
FIGS. 4A, 4B, and 4C illustrate a unit image distance for each projection method according to the first embodiment.
Figure 4B:
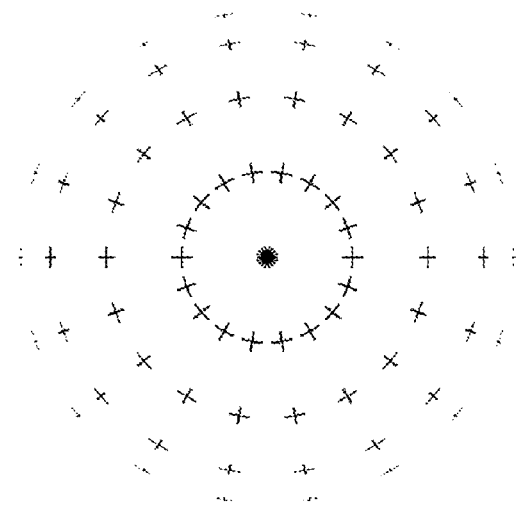
Figure 4C:
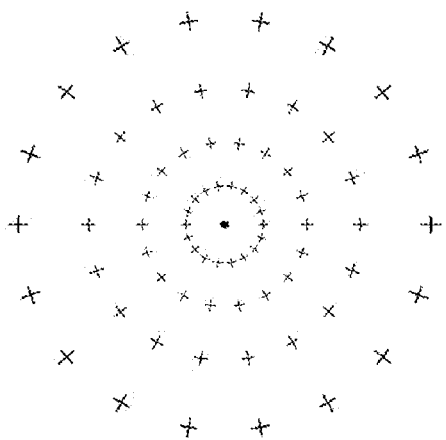

FIGS. 4A, 4B, and 4C illustrate differences on the image plane among perspective projection, orthographic projection, and equi-distortion projection. These figures illustrate, using line segments, viewing angles of 5° in each of the polar angle direction and the elevation direction on the image plane around the object point as a center for every polar angle of 15° in the polar angle direction and every azimuth angle of 20° in the azimuth direction. In the perspective projection illustrated in FIG. 4A, the line segments in the polar angle direction become longer on an outer circumference side of the image plane. In the orthographic projection illustrated in FIG. 4B, the line segments in the polar angle direction become shorter on an outer circumference side of the image plane. On the other hand, in the equi-distortion projection illustrated in FIG. 4C, the line segments in the polar angle direction and the elevation angle direction are equal to each other. Thus, since the distortion ratio is 1 in an image of the equi-distortion projection regardless of the polar angle, an object is not distorted regardless of the position in this image.

In general, images with no distortion or small distortion, such as images within a standard angle of view, are used as training data for machine learning for object detection. A typical example of the standard angle of view is an angle of view with a focal length of 50 mm for a 35 mm full-size image sensor, which corresponds to a diagonal angle of view of 46°. The polar angle corresponding to the 46° diagonal is 23°. The distortion ratio at the 23° polar angle of the perspective projection in FIG. 3 is 1.1. It is understood from this fact that the distortion with a distortion ratio of 1.1 is included in training data for general object detection. Even in stereographic projection with a small distortion ratio among the existing projection methods, the distortion ratio may become lower than 0.9 at a polar angle of 45° or higher, which is a factor in lowering the object detection accuracy.

From the above, using a projection method that satisfies the following inequality (2) using the image distance radius r, the focal length f, and the polar angle θ of 45° or higher can generate an image in which the deterioration of the object detection accuracy is suppressed.

$$0.9 \le \frac{1}{\sqrt{f^2 + r^2}} \frac{dr}{d\theta} \le 1.1 \quad (2)$$

Inequality (2) may be satisfied at all polar angles. An example of a projection function that satisfies inequality (2) is r/f=sinh(Dθ) with 0.9≤D≤1.1, and r/f=sinh(θ) at D=1.

Figure 5:
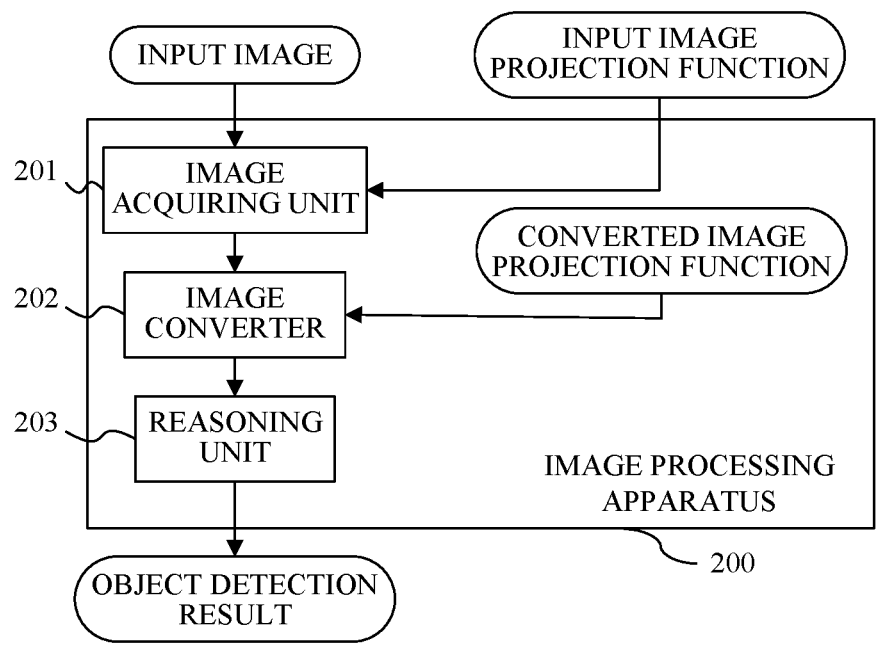
FIG. 5 illustrates a configuration of an image processing apparatus according to the first embodiment.

FIG. 5 illustrates a configuration (image processing method) of an image processing apparatus 200 according to a first embodiment. The image processing apparatus 200 includes an image acquiring unit 201, an image converter 202 as a generator, and a reasoning (inferring) unit 203 as a detector. The image processing apparatus 200 includes a computer (PC, etc.) that includes at least one CPU, etc., and the computer executes processing (steps) as the image acquiring unit 201, the image converter 202, and the reasoning unit 203 according to computer programs.

The image acquiring unit 201 acquires an input image as a first image and a projection method (first projection method) of the input image. For example, the input image is a fisheye image, and its projection method is equidistant projection. The input image may be a wide-field image in perspective projection.

The image converter 202 generates a converted image of equi-distortion projection from the input image received from the image acquiring unit 201 and the projection function (first projection function) of the projection method. More specifically, the image converter 202 first calculates a direction of ray (ray direction) incident on each pixel point on the converted image based on the projection function (second projection function) of the converted image. At this time, the projection function that satisfies the inequality (2) is used as the projection function of the converted image. The ray direction may be represented by the polar angle 108 and the azimuth angle or may be represented by an equivalent expression.

Next, the image converter 202 converts the ray direction to a position of a pixel point on the input image based on the projection function of the input image. The position of the pixel point may be represented by the image distance radius 107 and the azimuth angle or may be represented by an equivalent expression.

The image converter 202 then obtains a pixel value at the position of the image point on the input image and sets it to a value of a pixel point on the converted image. In a case where positions of pixel points on the input image do not correspond one-to-one with pixels of the input image, the pixel values may be determined by interpolation using a plurality of pixel values corresponding to the positions of the pixel points. Through the above processing, the image converter 202 generates a converted image from the input image.

The reasoning unit 203 performs object detection from the image in equi-distortion projection as the converted image received from the image converter 202, and outputs an object detection result. The object detection result includes position information of an object in the converted image and classification information of the object. In object detection, the position and classification of the object are detected (calculated) by the reasoning calculation using a reasoning model (machine-trained model) that has been trained by machine learning. Machine learning may use deep learning, and the reasoning model may use a training model using planar images. Since a projection function that satisfies inequality (2) is used for the projection function of the converted image, the converted image has been converted into an image with a smaller distortion ratio than that of a planar image for machine learning. Therefore, even if the input image is a wide-field (wide-field-angle) image, the deterioration of the object detection accuracy can be suppressed.

The image converter 202 may determine whether or not the projection function of the input image satisfies inequality (2), and if so, generate the same converted image as the input image. In this case, a calculation amount for generating the converted image cab be reduced. The input image may be an image whose projection function satisfies inequality (2).

Second Embodiment

Figure 6:
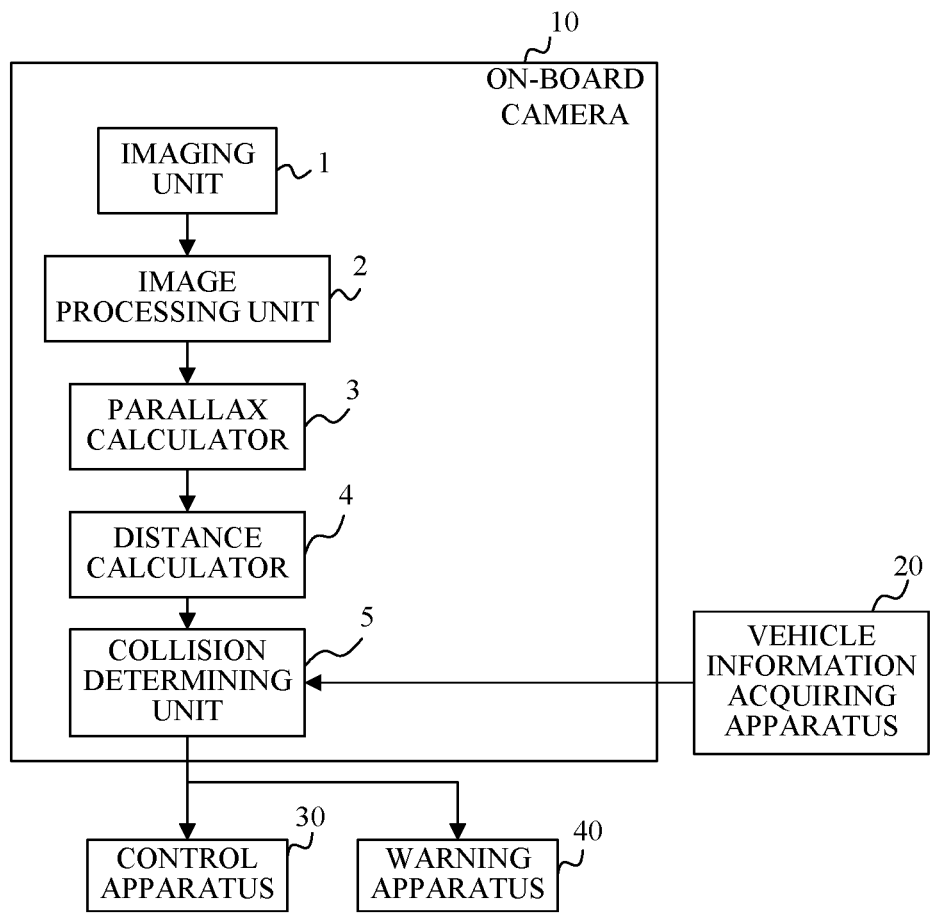
FIG. 6 is a functional block diagram of an on-board system according to a second embodiment.

FIG. 6 illustrates a configuration of an on-board camera 10 and an on-board (in-vehicle) system (driving support apparatus) 600 having the on-board camera 10 according to a second embodiment. The on-board system 600 is a system held by a movable apparatus (movable apparatus) such as an automobile (vehicle), and configured to support driving (steering) of the vehicle based on image information around the vehicle acquired by the on-board camera 10.

Figure 7:
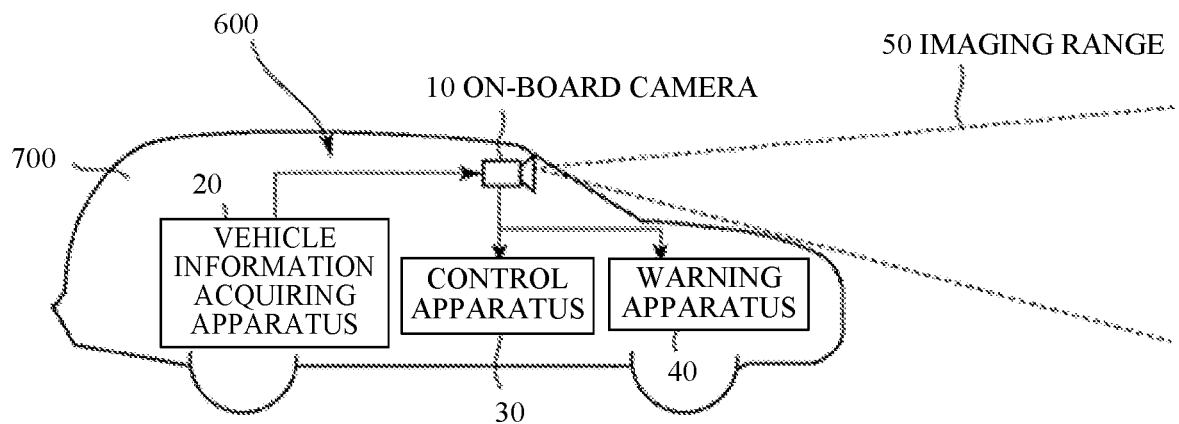
FIG. 7 is a schematic diagram of a vehicle according to the second embodiment.

FIG. 7 illustrates a vehicle 700 as a movable apparatus having the on-board system 600. FIG. 7 illustrates a case where an imaging range 50 of the on-board camera 10 is set in front of the vehicle 700, but the imaging range 50 may be set in the rear or side of the vehicle 700, for example.

As illustrated in FIGS. 6 and 7, the on-board system 600 includes an on-board (in-vehicle) camera 10, a vehicle information acquiring apparatus 20, a control apparatus (control unit, ECU: electronic control unit) 30, and a warning apparatus (warning unit) 40. As illustrated in FIG. 7, the on-board camera 10 includes an imaging unit 1, an image processing unit 2, a parallax calculator 3, a distance calculator 4, and a collision determining unit 5. The image processing unit 2 is the image processing apparatus 200 according to the first embodiment. The image processing unit 2, the parallax calculator 3, the distance calculator 4, and the collision determining unit 5 constitute a processing unit. The imaging unit 1 includes the optical system (103) such as a fisheye lens described in the first embodiment, and an image sensor such as a CMOS sensor that images a three-dimensional space including an object through the optical system.

Figure 8:
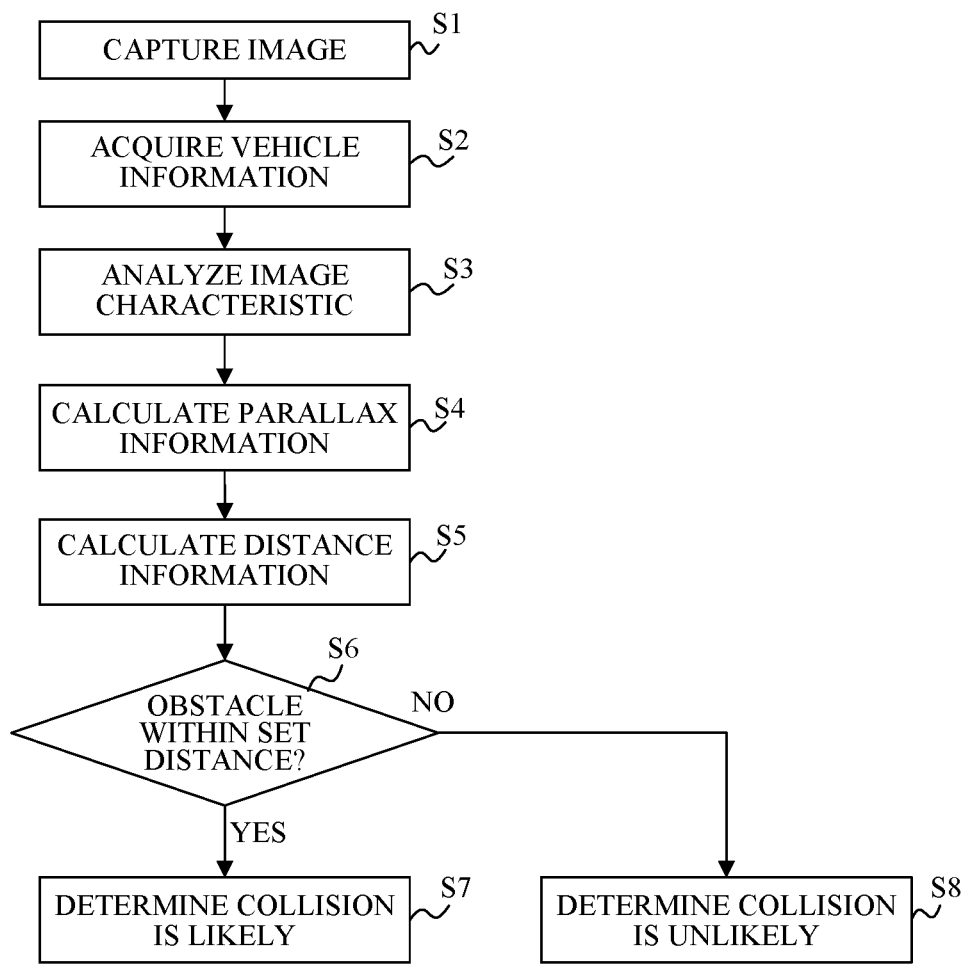
FIG. 8 is a flowchart illustrating an operation example of the on-board system according to the second embodiment.

FIG. 8 is a flowchart illustrating the operation of the on-board system 600. First, in step S1, an object such as an obstacle or a pedestrian around the vehicle is imaged using the imaging unit 1, and a plurality of image data (parallax image data) are acquired.

In step S2, the vehicle information acquiring apparatus 20 acquires vehicle information. Vehicle information includes a vehicle speed, a yaw rate, a steering angle, and the like of the vehicle.

In step S3, a plurality of image data (input images such as fisheye images) acquired by the imaging unit 1 are converted into images in equi-distortion projection as described in the first embodiment and object detection is performed in the equi-distortion projection method.

In step S4, the parallax calculator 3 calculates parallax (image shift) information between the plurality of image data acquired by the imaging unit 1. Known methods such as the SSDA method and the area correlation method can be used as the parallax information calculating method, and a detailed description thereof will be omitted. Steps S2, S3, and S4 may be performed in the order described above or may be performed in parallel with each other.

In step S5, distance information to the object imaged by the imaging unit 1 is acquired (calculated) by the distance calculator 4. The distance information can be calculated based on the parallax information calculated by the parallax calculator 3 and internal and external parameters of the imaging unit 1. The distance information here refers to information about a position relative to the object, such as a distance to the object, a defocus amount, and an image shift amount, and may directly represent a distance value of the object in the image or indirectly represent information corresponding to the distance value.

In step S6, the collision determining unit 5 determines whether or not the distance to the object is within a preset distance range using the vehicle information acquired by the vehicle information acquiring apparatus 20 and the distance information calculated by the distance calculator 4. Thereby, it is possible to determine whether or not an object exists within the set distance around the vehicle, and to determine a likelihood of collision between the vehicle and the object. In a case where the object exists within the set distance, the collision determining unit 5 determines that "there is a likelihood of collision" (step S7), and in a case where the object does not exist within the set distance, the collision determining unit 5 determines that "there is no likelihood of collision" (step S8).

Next, in a case where the collision determining unit 5 determines that there is a likelihood of collision, the collision determining unit 5 notifies (transmits) the determination result to the control apparatus 30 and the warning apparatus 40. At this time, the control apparatus 30 controls the vehicle based on the determination result of the collision determining unit 5 (step S6), and the warning apparatus 40 warns the vehicle user (driver, passenger) based on the determination result of the collision determining unit 5 (step S7). The determination result may be notified to at least one of the control apparatus 30 and the warning apparatus 40.

The control apparatus 30 can control the movement of the vehicle by outputting a control signal to a driving unit (engine, motor, etc.) of the vehicle. For example, the control apparatus 30 performs control such as applying a brake in a vehicle, releasing an accelerator, turning a steering wheel, generating a control signal for generating a braking force in each wheel, and suppressing an output of an engine or a motor. The warning apparatus 40 warns the user, for example, by emitting a warning sound (warning alarm), displaying warning information on the screen of the car navigation system, or vibrating a seat belt or steering wheel.

The on-board system 600 described above can effectively perform object detection and collision determination in a wide field of view, and avoid collisions between the vehicle and the object.

The distance information may be calculated by another method. For example, assume that a pupil division type image sensor having a plurality of pixel units regularly arranged in a two-dimensional array is applied to the image sensor in the imaging unit 1. In the pupil division type image sensor, one pixel unit includes a microlens and a plurality of photoelectric conversion units, receives a pair of light beams passing through different areas in the pupil of the optical system, and outputs a pair of image data from the respective photoelectric conversion units. Then, an image shift amount of each area is calculated by correlation calculation between the paired image data, and image shift map data representing a distribution of image shift amounts is calculated by the distance calculator 4. Alternatively, the distance calculator 4 may further convert the image shift amount into a defocus amount and generate defocus map data representing a distribution of defocus amounts (distribution on the two-dimensional plane of the captured image). The distance calculator 4 may acquire distance map data of a distance to the object converted from the defocus amount.

The on-board system 600 or the vehicle 700 may include a notification apparatus (notification unit) configured to notify, if the vehicle 700 should collide with an obstacle, an on-board system manufacturer and a vehicle 700 dealer of the fact. For example, the notification apparatus may use an apparatus that transmits information (collision information) about the collision between the vehicle 700 and the obstacle to a preset external notification destination by e-mail or the like.

Thus, adopting a configuration in which the collision information is automatically notified by the notification apparatus can promptly respond to inspections and repairs after a collision occurs. The notification destination of the collision information may be an insurance company, a medical institution, the police, or an arbitrary destination set by the user. The notification apparatus may be configured to notify the notification destination not only of the collision information but also of failure information of each part and consumption information of consumables. The presence or absence of collision may be detected using distance information acquired based on the output from the distance calculator 4 or another detector (sensor).

This embodiment applies the on-board system 600 to driving support (collision damage reduction) but is not limited to this example. The on-board system 600 can be used for cruise control (including adaptive cruise control function) and automatic driving. The on-board system 600 can be applied not only to vehicles such as automobiles, but also to a moving body such as a ship, an aircraft, and an industrial robot. The embodiment is applicable not only to movable apparatuses but also to various apparatuses that use object recognition, such as intelligent transportation systems (ITS) and monitoring systems.

In this embodiment, the on-board camera 10 serves as a distance measuring apparatus but the on-board camera may have functions other than the distance measuring apparatus. For example, an on-board camera may be placed at the rear or side of the vehicle, and the acquired image information may be displayed on a display unit (monitor) inside the vehicle for driving support. In this case, it is unnecessary to provide the parallax calculator, the distance calculator, the collision determining unit, or the like, which are used for distance measurement.

The image processing apparatus according to the first embodiment may be used for an image pickup apparatus other than an on-board system. For example, it may be used in an image pickup apparatus such as a digital still camera, a digital video camera, and a film-based camera.

This embodiment can perform object detection with high accuracy using a wide-field image.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-144761, filed on Sep. 12, 2022, which is hereby incorporated by reference herein in its entirety.

What is claimed is:

1. An image processing apparatus comprising:
a memory storing instructions; and
a processor configured to execute the instructions to:
generate, using a first image obtained by imaging a three-dimensional space including an object through an optical system of a first projection method, a second image obtained by a second projection method different from the first projection method, and
perform object detection using the second image,
wherein where an elevation angle is defined in an angle direction orthogonal to a polar angle direction in an azimuth of an object point within the three-dimensional space expressed by a polar coordinate system with a pole that is set to an optical axis of the optical system, a first ratio is defined as a ratio of a change rate of an image length relative to a polar angle on the first image relative to the object point to a change rate of an image length relative to the elevation angle on the first image relative to the object point, and a second ratio is defined as a ratio of a change rate of an image length relative to the polar angle on the second image relative to the object point to a change rate of an image length relative to the elevation angle on the second image relative to the object point, the second ratio is closer to 1 than the first ratio at a polar angle of 45° or more and the second ratio is 0.9 or higher and 1.1 or lower.

2. The image processing apparatus according to claim 1, wherein the second projection method satisfies the following inequality:

$$0.9 \le \frac{1}{\sqrt{f^2+r^2}} \frac{dr}{d\theta} \le 1.1$$

where f is a focal length of the optical system, r is a distance between an origin on the optical axis of the optical system on the second image and an image point corresponding to the object point, and θ is the polar angle.

3. The image processing apparatus according to claim 2, wherein the second projection method satisfies the following equation:

$$r/f = \sinh(D\theta)$$

where f is a focal length of the optical system, r is a distance between an origin on the optical axis of the optical system on the second image and an image point corresponding to the object point, θ is the polar angle, and D is the second ratio.

4. The image processing apparatus according to claim 1, wherein the processor is configured to perform the object detection by reasoning calculation using a machine-trained model for planar images.

5. The image processing apparatus according to claim 1, wherein the first projection method is any one of stereographic projection, equidistant projection, equisolid angle projection, and orthographic projection.

6. An image processing method comprising the steps of:
generating, using a first image obtained by imaging a three-dimensional space including an object through an optical system of a first projection method, a second image obtained by a second projection method different from the first projection method; and
performing object detection using the second image,
wherein where an elevation angle is defined in an angle direction orthogonal to a polar angle direction in an azimuth of an object point within the three-dimensional space expressed by a polar coordinate system with a pole that is set to an optical axis of the optical system, a first ratio is defined as a ratio of a change rate of an image length relative to a polar angle on the first image relative to the object point to a change rate of an image length relative to the elevation angle on the first image relative to the object point, and a second ratio is defined as a ratio of a change rate of an image length relative to the polar angle on the second image relative to the object point to a change rate of an image length relative to the elevation angle on the second image relative to the object point, the second ratio is closer to 1 than the first ratio at a polar angle of 45° or more and the second ratio is 0.9 or higher and 1.1 or lower.

7. An image pickup apparatus comprising:
the image processing apparatus according to claim 1,
an imaging unit configured to generate an input image by imaging the object via the optical system.

8. An on-board system comprising:
the image pickup apparatus according to claim 7,
a determining unit configured to determine a likelihood of collision between a movable apparatus and the object based on information about the object acquired by the image pickup apparatus.

9. The on-board system according to claim 8, further comprising a control apparatus configured to output a control signal for generating a braking force to the movable apparatus in a case where the control apparatus determines that there is the likelihood of collision between the movable apparatus and the object.

10. The on-board system according to claim 8, further comprising a warning apparatus configured to warn a user of the movable apparatus in a case where it is determined that there is the likelihood of collision between the movable apparatus and the object.

11. The on-board system according to claim 8, further comprising a notification apparatus configured to notifying an external destination of information about the collision between the movable apparatus and the object.

12. A movable apparatus comprising the on-board system described in claim 8,
wherein the movable apparatus is configured to hold and movable with the on-board system.

* * * * *